Patented Sept. 9, 1941

2,255,228

UNITED STATES PATENT OFFICE 2,255,228

METHYLENE DISULPHIDE POLYMER

Joseph C. Patrick, Morrisville, Pa.

No Drawing. Original application August 9, 1930, Serial No. 474,299. Divided and this application June 27, 1940, Serial No. 342,689

5 Claims. (Cl. 260—67)

This application is a division of my copending application Serial No. 474,299, filed August 9, 1930, now Patent 2,206,641.

The present invention relates to improvements in plastic materials, and more particularly those derived by the reaction of polysulphides on reactive methylene bodies, and the resulting products, and will be fully understood from the following description thereof, illustrated by examples descriptive of certain specific embodiments thereof. It will be understood, however, that the details of these specific examples are set forth for the purpose of illustrating the invention, and are not to be regarded as limitations thereon.

I have found that high sulphur-containing plastic bodies may be produced by the reaction of soluble polysulphides on reactive methylene bodies, such as the methylene dihalides, formaldehyde, polymerized formaldehydes, hexamethylenetetramine and the like. In carrying out the reaction, I may employ approximately equimolecular proportions of the reacting constituents or larger proportions of the reactive methylene bodies. The polysulphides employed are preferably those soluble in water, and they may be employed in aqueous or alcoholic solution. The products obtained are in general white, yellow, or yellowish-white products; have a high sulphur content, in general exceeding 65%, and certain of them containing as much as 90% and more of combined sulphur, with carbon and hydrogen; and are readily moldable with a mild application of heat.

The following examples illustrate the present invention:

1. Formaldehyde (suitably in the form of the usual formaldehyde solution) and a soidum polysulphide solution in water, the polysulphide having the empirical formulae $Na_2S_2$ are mixed on a hot water bath under an efficient reflux condenser to secure completion of reaction. Several hours, say four to five, is ordinarily sufficient, and the mixture may subsequently be allowed to stand for some time longer, say up to one day. A white, powdery reaction product is thrown out and contains the desired polysulphide plastic together with polymerized formaldehyde. The latter is driven off by heating the separated product at a moderate temperature, suitably on a water bath. The remaining polysulphide product is washed and dried, and is a white, almost odorless powder, capable of being molded at moderate temperature, say 100 to 148° C., under pressure into a hard, white, ivory-like product. The material is composed entirely of carbon, hydrogen and sulphur, containing about 68% by weight of the latter and begins to melt at about 148° C. The melting point is not sharp. The material may be compounded with any suitable fillers, coloring matter, or other compounding ingredients.

2. Formaldehyde and sodium or potassium tetrasulphide, the latter in aqueous or alcoholic solution, are mixed to form a mixture containing approximately 3 mols of formaldehyde to each mol of the tetrasulphide. The mixture is mildly heated under a reflux condenser and reaction occurs readily, requiring only a short period of heating on a water bath or even at lower temperatures. A rather sticky reaction product is thrown down, and is separated and purified by washing. It hardens rapidly in air to a fairly hard, somewhat brittle material containing only carbon, hydrogen and sulphur, the proportion of the latter being about 79.6%. It begins to melt at about 120° C. and may be readily molded by mild pressure at temperatures of, say, 80 to 120° C. It may suitably be compounded with various inert fillers, pigments or or other coloring matter, as desired.

In reactions such as those above described, any of the soluble polysulphides, such as those of sodium, potassium, calcium, or the like may be employed in either aqueous or alcoholic solution. The formaldehyde may be replaced by equivalent proportions of its reactive polymers, hexamethylenetetramine, or other reactive methylene bodies. In general, as there is some loss of the formaldehyde or equivalent material from the reaction vessel, an excess of the latter is desirable.

3. Approximately equimolecular proportions of methylene dichloride and a soluble tetrasulphide are mixed in either aqueous or alcoholic solution. Either calcium, potassium, or sodium tetrasulphide may be used and the solvent may be water, alcohol, or preferably an alcoholic menstruum containing about equal proportions by volume of alcohol and water. The mixture is heated to about 120° F. or to mild boiling under a reflux condenser. An opaque, yellow, plastic, resin-like substance is thrown out, which is removed and on washing and drying is found to contain carbon, hydrogen and sulphur in combined form, with approximately 90% of the latter. The material has apparently substantially the empirical formulae $(CH_2)S_4$ and is apparently formed by a true reaction between the methylene dichloride and the polysulphide with the elimination of a proportion of the metallic chloride corresponding to that required by the reaction. The resulting methylene sulphur compound is quite thermo-stable; begins to melt at about 140° C., but does not have a sharp melting point; and may be heated to 178° C. without appreciable decomposition. At temperatures of 140° or slightly thereunder, say down to about 120° C., it can be readily molded under pressure. It has a high heat insulating and high dielectric qualities. It may readily be compounded with suitable fillers, pigments or other compounding ingredients as desired.

4. I follow the procedure as set forth in Example 3, using instead of the tetrasulphide a disulphide, the reaction being otherwise carried out under the same conditions. A white, powdery substance is precipitated out, which apparently repels water, being hard to wet. This product is washed and corresponds in its composition approximately to a methylene disulphide, containing only carbon, hydrogen and sulphur with the latter in proportion about 76%. It is thermo-plastic, beginning to melt at about 145° C., although it does not have a sharp melting point. It does not decompose readily, at least at temperatures up to about 165° C. It may be readily molded at temperatures in the beginning of its melting point range or somewhat thereunder. It has high heat insulating and dielectric properties, and may be compounded with any desired compounding ingredients.

It will be readily apparent that other polysulphides such as the trisulphide, or with fractional proportions of sulphur may be employed in these reactions; and in place of methylene dichloride, other methylene dihalides such as the dibromide, the diiodide, or mixed dihalides may be employed, as may also other reactive methylene bodies. The reaction begins at temperatures considerably lower than those set forth as preferred in the examples above, and if desired, may be conducted at higher temperatures under superatmospheric pressure.

I claim:

1. The process which comprises reacting an alkaline metallic disulphide with a reactive methylene body.

2. A product substantially identical with that obtained by the process of claim 1.

3. The process which comprises reacting an alkaline metallic disulphide with formaldehyde.

4. The process which comprises reacting an alkaline metallic disulphide with hexamethylenetetramine.

5. The process which comprises reacting an alkaline metallic disulphide with a methylene dihalide.

JOSEPH C. PATRICK.